No. 633,562. Patented Sept. 26, 1899.
E. E. BELL.
CENTRIFUGAL CREAM SEPARATOR.
(Application filed Nov. 14, 1898.)
(No Model.)
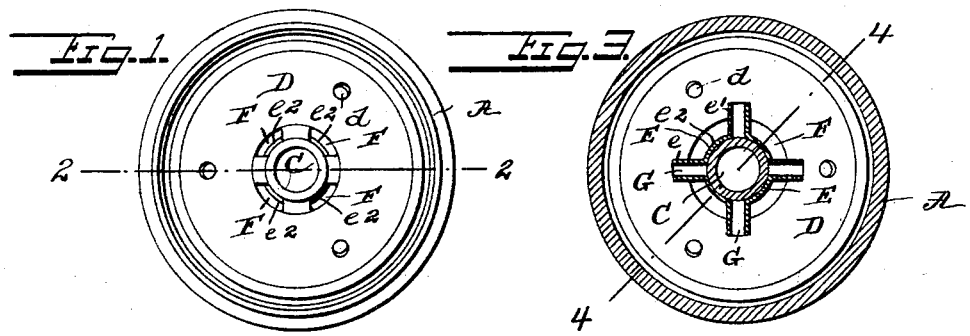
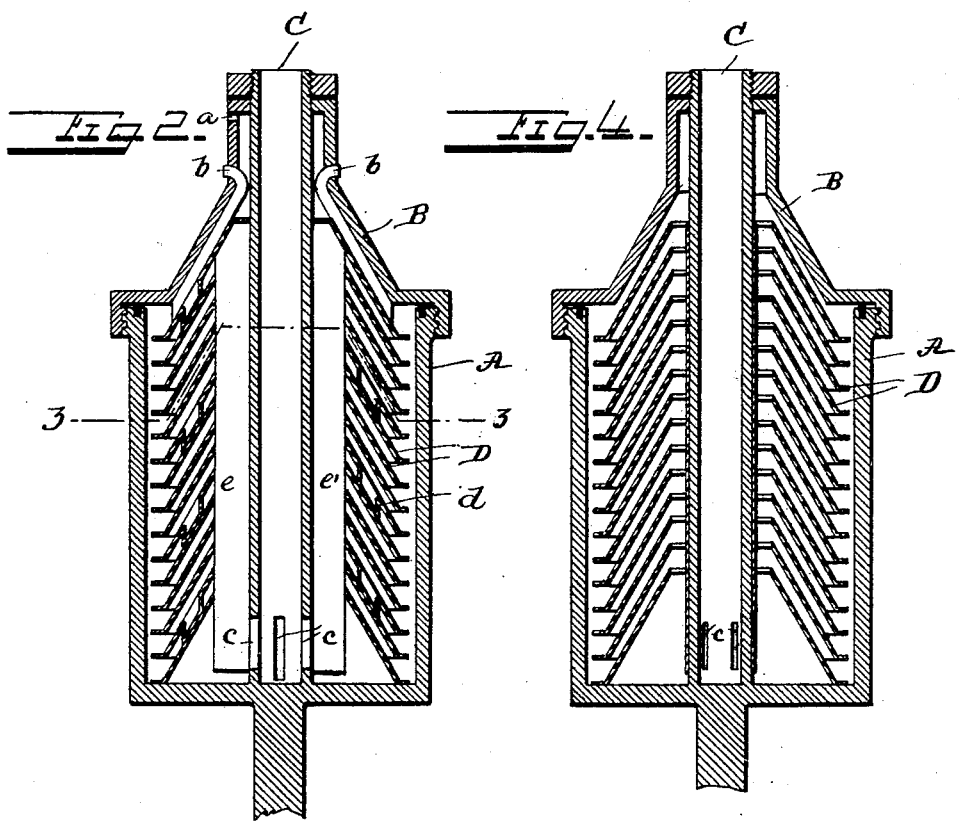
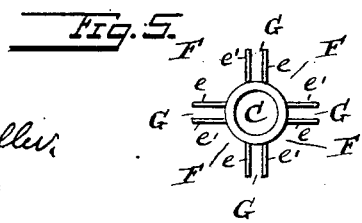
WITNESSES:
Jesse B. Heller
M. F. Ellis
INVENTOR
Ernest E. Bell
BY
Harding & Harding
ATTORNEYS.
THE NORRIS PETERS CO., PHOTO-LITHO., WASHINGTON, D. C.

UNITED STATES PATENT OFFICE.

ERNEST E. BELL, OF NEWARK, NEW JERSEY, ASSIGNOR TO THE DE LAVAL SEPARATOR COMPANY, OF SAME PLACE.

CENTRIFUGAL CREAM-SEPARATOR.

SPECIFICATION forming part of Letters Patent No. 633,562, dated September 26, 1899.

Application filed November 14, 1898. Serial No. 696,367. (No model.)

*To all whom it may concern:*

Be it known that I, ERNEST E. BELL, a citizen of the United States, residing at Newark, county of Essex, and State of New Jersey, have invented a new and useful Improvement in Centrifugal Cream-Separators, of which the following is a full, clear, and exact description, reference being had to the accompanying drawings, which form a part of this specification.

My invention is adapted to that class of cream-separators in which the bowl is provided with a series of division devices crossing the radial line of the bowl, and has for its object a construction for feeding the full milk so that it shall be delivered evenly throughout the bowl and beyond the cream wall or zone.

The invention can be best understood by reference to the accompanying drawings, in which—

Figure 1 is a plan view of the bowl containing my improvement with cover removed. Fig. 2 is a section on line 2 2 of Fig. 1. Fig. 3 is a section on line 3 3 of Fig. 2. Fig. 4 is a section on line 4 4 of Fig. 3. Fig. 5 is a detail view of feed device and one form of securing same in position.

A is the bowl; B, the cover or top; C, the tubular shaft, and D a series of superposed inclined disks having a central annular orifice, as shown, $d$ being spacing projections.

$a$ is the cream-outlet, and $b$ the skim-milk outlet.

The tubular shaft is closed at the bottom, but has the side orifice $c$.

E are a series of upright plates bent, as shown, to form the two sides $e\ e'$ and end $e^2$. There are four of these shown, though the number of these plates may be varied, as desired. These plates lie around the tubular shaft C, so as to have the end $e^2$ rest against the shaft C and a space $e^3$ between each plate E, formed between adjacent sides of adjacent plates. This space is open at each end, and the length of the walls $e\ e'$ is such that the outer end of the space $e^3$ will be without the cream wall or zone of the bowl. The plates in the aggregate must extend entirely around the tubular shaft and may be held in place or position by being soldered or secured to the top disk or may be secured to the tubular shaft. These plates extend up through the disks, with the exception of the top disk, which rests on top of the plates. As may be seen, these plates form two passages, one between the sides $e\ e'$ of the plates and the other between adjacent sides of adjacent plates. I have denoted in the drawings the former of these passages by the letter F and the latter by letter G. The inner end of passage F is within the cream zone or line and the outer end of passage G is without the cream-zone. The walls of these passages prevent any commingling of the materials.

The operation is as follows: The full milk is fed into the bowl through the tubular shaft C and escapes into the bowl through the orifices $c$, and under the action of centrifugal force will be thrown outward and as it accumulates will rise up the passages G, escaping from the outer opening beyond the cream-wall. The cream formed throughout the bowl will be forced toward the center and rise in the passage F to the cream-outlet $a$, the skim-milk through the bowl flowing toward the periphery and escaping by skim-milk orifice $b$.

As may be seen by this construction, the full milk is fed regularly throughout the bowl beyond the cream wall or zone and the cream rises to its discharge-outlet without contacting with the incoming full milk.

Having now fully described my invention, what I claim, and desire to protect by Letters Patent, is—

1. In a centrifugal cream-separator, the combination with the bowl and central feed-tube provided with an opening for the discharge of the full milk at its lower end, of a series of vertically-extending plates surrounding and extending alongside of said central feed-tube, each plate being bent longitudinally to form two wings extending laterally in different directions toward the periphery, the two adjoining wings of adjacent plates forming passages exterior to the central feed-tube for the conveyance of the full milk from the central feed-tube to the separating-space of the bowl.

2. In a centrifugal cream-separator, the combination with the bowl and central feed-tube provided with orifices for the discharge of the full milk, of a series of vertically-extending plates surrounding, and extending alongside of said central feed-tube, each plate being bent longitudinally to form two wings extending laterally in different directions toward the periphery, the two adjoining wings of adjacent plates forming passages exterior to the central feed-tube for the conveyance of the full milk from the central feed-tube to the separating-space of the bowl.

3. In a centrifugal cream-separator, the combination with the bowl, the central feed-tube, and a plurality of superposed inclined disks between the tube and the periphery of the bowl, of a series of vertically-extending plates surrounding said central feed-tube, each plate being bent longitudinally to form two wings extending laterally in different directions toward the periphery, the two adjoining wings of adjacent plates forming passages exterior to the central feed-tube for the conveyance of the full milk from the central feed-tube and its distribution throughout the spaces formed between said superposed disks.

4. In a centrifugal cream-separator, the combination with the bowl, the central feed-tube, and a plurality of superposed inclined disks between the tube and the periphery of the bowl, but not contacting with the feed-tube, of a series of vertically-extending plates surrounding said central feed-tube, each plate being bent longitudinally to form two wings extending laterally in different directions toward the periphery, the two adjoining wings of adjacent plates forming passages exterior to the central feed-tube for the conveyance of the full milk from the said orifices and its distribution throughout the spaces formed between said superposed disks, the outer ends of said wings occupying a position between the inner and outer ends of said disks.

5. In a centrifugal cream-separator, the combination with the bowl, of a series of vertically-extending plates arranged around the axis thereof, each plate being bent longitudinally to form two wings extending laterally in different directions toward the periphery, the two adjoining wings of adjacent plates forming passages for the distribution of the full milk to the separating-space of the bowl, and a feed-pipe communicating with said passages.

6. In a centrifugal cream-separator, the combination with the bowl, and a plurality of superposed inclined disks within the bowl, of a series of vertically-extending plates arranged around the axis thereof, each plate being bent longitudinally to form two wings extending laterally in different directions toward the periphery, the two adjoining wings of adjacent plates forming passages for the distribution of the full milk throughout the spaces formed between said superposed disks, the said wings extending toward the periphery beyond the inner ends of said superposed disks, and a feed-pipe communicating with said passages.

In testimony of which invention I have hereunto set my hand, at New York, N. Y., on this 10th day of November, 1898.

ERNEST E. BELL.

Witnesses:
  J. J. BERRIGAN,
  M. F. ELLIS.